United States Patent
Chien

(10) Patent No.: US 9,534,904 B2
(45) Date of Patent: Jan. 3, 2017

(54) ELECTRONIC DEVICE AND NAVIGATION METHOD FOR INDOOR ESCAPING

(71) Applicant: HON HAI PRECISION INDUSTRY CO., LTD., New Taipei (TW)

(72) Inventor: Cheng-Ching Chien, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/807,391

(22) Filed: Jul. 23, 2015

(65) Prior Publication Data

US 2016/0349060 A1 Dec. 1, 2016

(30) Foreign Application Priority Data

May 25, 2015 (CN) .......................... 2015 1 0270677

(51) Int. Cl.
G01C 21/20 (2006.01)
G01C 21/26 (2006.01)
H04W 4/04 (2009.01)

(52) U.S. Cl.
CPC ............ *G01C 21/206* (2013.01); *H04W 4/043* (2013.01)

(58) Field of Classification Search
CPC ......... G08B 21/10; G08B 17/06; G08B 7/066; G08B 27/006; G06Q 10/00; G06F 17/30241; G01C 21/206; G01C 21/00; G01C 21/20; G01C 21/34

USPC ................ 701/423, 425, 533, 469; 340/540; 455/456.1

See application file for complete search history.

(56) References Cited

U.S. PATENT DOCUMENTS

| | | | |
|---|---|---|---|
| 2014/0222329 A1* | 8/2014 | Frey ....................... | G08B 7/066 701/423 |
| 2015/0170503 A1* | 6/2015 | Wedig .................... | G08B 7/066 340/691.5 |
| 2016/0049064 A1* | 2/2016 | McNabb ................ | G08B 21/10 340/540 |

* cited by examiner

*Primary Examiner* — Marthe Marc-Coleman
(74) *Attorney, Agent, or Firm* — Zhigang Ma

(57) ABSTRACT

A navigation method for indoor escaping is executed by at least one processor of an electronic device. At least three message transmitters fixed in a building around the electronic device are connected with the electronic device. Messages are received from each message transmitter. The messages include location information of each message transmitter and a floor plan of the building. A current position of the electronic device is determined according to the location information of each message transmitter and signal strength of each connection between the electronic device and each message transmitter when receiving a fire alarm and a position of the fire. An optimal escape route is calculated according to the floor plan of the building, the position of the electronic device, and the position of the fire. Navigation is provided to a user of the electronic device to escape from the building.

20 Claims, 4 Drawing Sheets

ELECTRONIC DEVICE AND NAVIGATION METHOD FOR INDOOR ESCAPING

CROSS-REFERENCE TO RELATED APPLICATIONS

This application claims priority to Chinese Patent Application No. 201510270677.1 filed on May 25, 2015, the contents of which are incorporated by reference herein.

FIELD

The subject matter herein generally relates to navigation technology, and particularly to an electronic device and a navigation method for indoor escaping.

BACKGROUND

Fire in a building often causes large numbers of casualties. The main reason is that people are not familiar with escape routes in the building.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
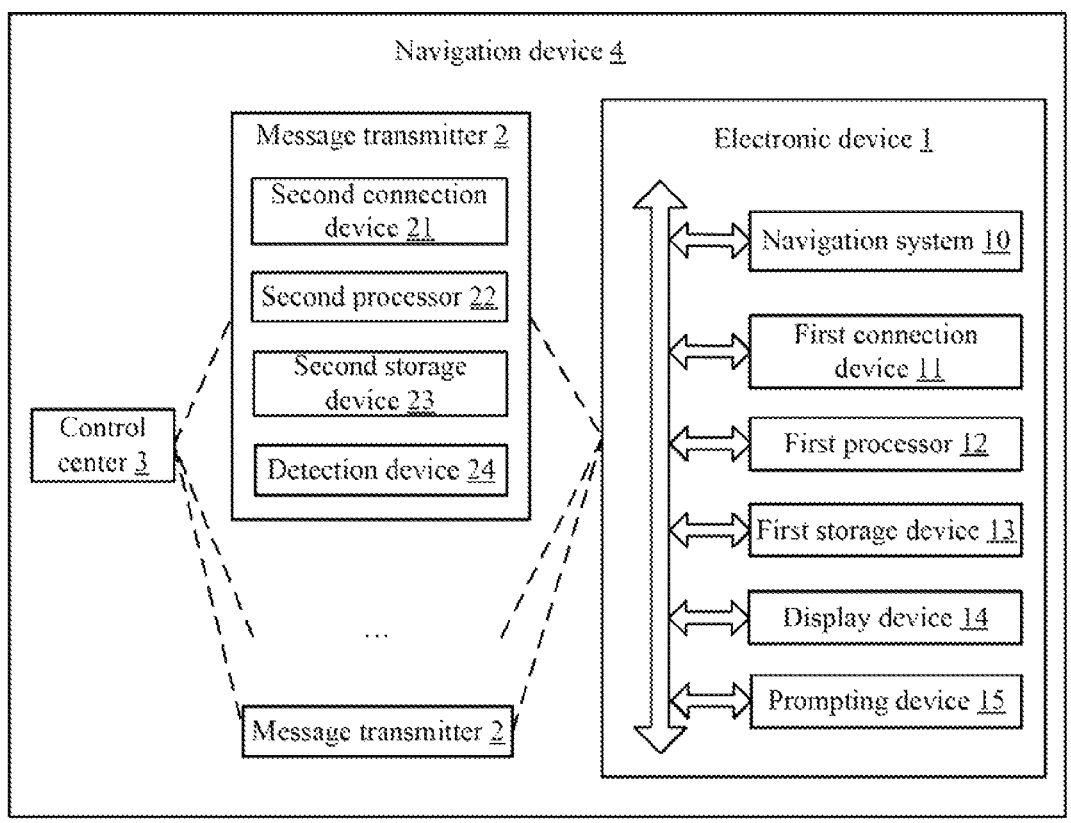
FIG. 1 is a block diagram of one example embodiment of a navigation device for indoor escaping.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The present disclosure, including the accompanying drawings, is illustrated by way of examples and not by way of limitation. It should be noted that references to "an" or "one" embodiment in this disclosure are not necessarily to the same embodiment, and such references mean "at least one".

The term "module", as used herein, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 is a block diagram of one example embodiment of a navigation device for indoor escaping. In one embodiment as shown in FIG. 1, a navigation device 4 for indoor escaping includes at least one electronic device 1 (FIG. 1 shows only one), at least three message transmitters 2, and at least one control center 3. The electronic device 1 includes a navigation system 10 for indoor escaping. The electronic device 1 also includes a first connection device 11. The message transmitter 2 includes a second connection device 21. The electronic device 1 can connect with the message transmitter 2 through the first connection device 11 and the second connection device 21. The first connection device 11 and the second connection device 21 can be, but are not limited to, BLUETOOTH devices, wireless adapters, or other wireless communication devices. All message transmitters 2 are connected to the control center 3 through a wired or wireless connection.

The electronic device 1 also includes, but is not limited to, a first processor 12, a first storage device 13, a display device 14, and a prompting device 15. The message transmitter 2 also includes, but is not limited to, a second processor 22 and a second storage device 23. In at least one embodiment, the first processor 12 and the second processor 22 can be central processing units (CPU), microprocessors, or other data processor chips that perform functions. The first storage device 13 and the second storage device 23 can include various type(s) of non-transitory computer-readable storage medium. For example, the first storage device 13 and the second storage device 23 can be internal storage systems, such as flash memories, random access memories (RAM) for temporary storage of information, and/or read-only memories (ROM) for permanent storage of information. The first storage device 13 and the second storage device 23 can also be external storage systems, such as hard disks, storage cards, or data storage mediums.

The first storage device 13 stores data and code of the navigation system 10 for indoor escaping. The second storage device 23 stores a preset message. In this embodiment, the preset message stored in the second storage device 23 includes location information of the message transmitter 2 and a floor plan of a building that the message transmitters 2 are fixed in. The prompting device 15 is used to provide navigation to a user of the electronic device 1 to escape from the building. The prompting device 15 can be an audio device, a vibrator, or any other suitable device. The electronic device 1 can be a mobile phone, a tablet computer, or any other suitable mobile device.

In some embodiments, the message transmitter 2 is also used to detect fire. The message transmitter 2 includes a detection device 24. When a fire is detected by a message transmitter 2, the message transmitter 2 sends the position of the fire (that is, the location information of the message transmitter 2) to the control center 3. The message transmitter 2 can be a smoke detector which can also transmit messages. In other embodiments, the message transmitter 2 is not used to detect fire. The message transmitter 2 can be a router, a BLUETOOTH device, or any other suitable device. When the message transmitter 2 is not used to detect fire, the navigation device 4 for indoor escaping includes some fire other detectors connected with the control center 3 to detect fire. When a fire is detected by the fire detector, the fire detector can send a position of the fire to the control center 3. The fire detector can be a smoke detector, a hot flame detector, or any other suitable device.

The at least three message transmitters 2 are fixed to specified locations of floors of a building. Each message transmitter 2 stores a preset message. The preset message includes location information. In this embodiment, the location information is a coordinate, and all the coordinates stored in all the message transmitters 2 are in a same coordinate system. The message transmitter 2 sends message at a preset signal strength (such as −90 dBm) to the electronic device 1 which connects to the message transmitter 2. The message sent by the message transmitter 2 includes, but is not limited to, location information of the message transmitter 2 and a floor plan of the building. The message sent by the message transmitter 2 can also include other information, such as discount information. In some embodiments, the information sent by the message transmitter 2 can be edited through the control center 3. In other embodiments, the information sent by the message transmitter 2 can be directly edited through the message transmitter 2.

The at least one control center 3 is used to send a fire alarm and the position of the fire to all the message transmitters 2, when a fire alarm and a position of the fire are received from one message transmitter 2. The control center 3 can be a computer, a server, or any other suitable device. In some embodiments, the control center 3 can be located in the building, such as broadcasting room. A login to the control center 3 can be done remotely. In other embodiments, the control center 3 can be located outside the building.

When the electronic device 1 connects to at least three message transmitters 2, each message transmitter 2 sends message to the electronic device 1 at a preset signal strength. The message includes location information of the message transmitter 2 and the floor plan of the building. The navigation system 10 for indoor escaping determines a current position of the electronic device 1 according to the location information of each message transmitter 2 and signal strength of each connection between the electronic device 1 and each message transmitter 2. When receiving a fire alarm from a message transmitter 2, the navigation system 10 for indoor escaping calculates an optimal escape route according to the floor plan of the building, the position of the electronic device 1, and the position of the fire, and provides navigation to the user of the electronic device 1 to escape from the building with the prompting device 15.

If an electronic device 1 is far away from a message transmitter 2, the signal strength of the connection between the electronic device 1 and the message transmitter 2 is weak. If an electronic device 1 is close to a message transmitter 2, the signal strength of the connection between the electronic device 1 and the message transmitter 2 is strong. The navigation system 10 for indoor escaping can determine a distance between the electronic device 1 and the message transmitter 2 according to the signal strength of the connection between the electronic device 1 and the message transmitter 2. It should be noted that the electronic device 1 connects with at least three message transmitters 2 at one time. In other embodiment, if the electronic device 1 connects with less than three message transmitters 2 at one time, the navigation system 10 for indoor escaping cannot determine a current position of the electronic device 1.

For example, the electronic device 1 connects with three message transmitters 2. The coordinates received from the three message transmitters 2 are (x1, y1, z1), (x2, y2, z2), (x3, y3, z3). The navigation system 10 for indoor escaping determines the distances between the electronic device 1 and the respective three message transmitters 2. The distances are D1, D2, and D3. If the coordinate of the electronic device 1 is (x, y, z), there would be the following equations. $(x1-x)^2+(y1-y)^2+(z1-z)^2=D1^2$, $(x2-x)^2+(y2-y)^2+(z2-z)^2=D2^2$, and $(x3-x)^2+(y3-y)^2+(z3-z)^2=D3^2$.

Figure 2:
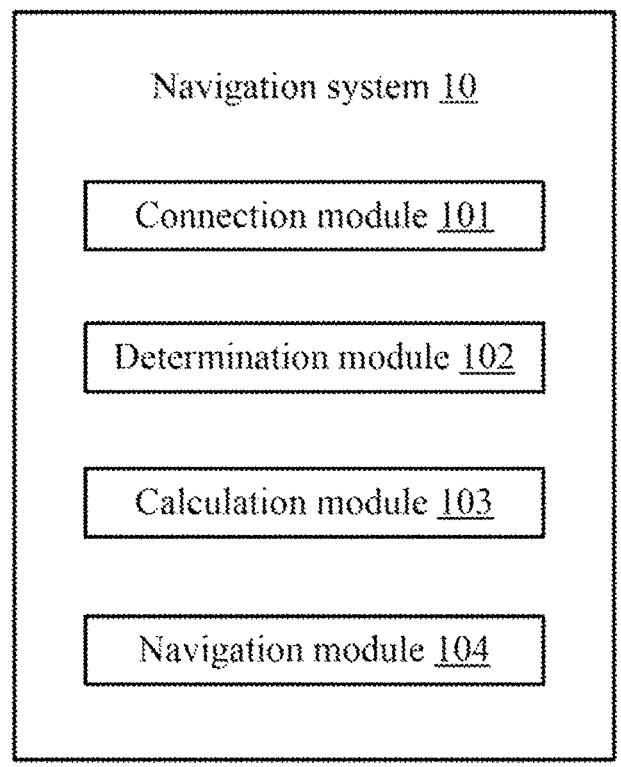
FIG. 2 is a block diagram of one embodiment of function modules of a navigation system for indoor escaping.

Referring to FIG. 2, in at least one embodiment, the navigation system 10 for indoor escaping can include a connection module 101, a determination module 102, a calculation module 103, and a navigation module 104. The function modules 101-104 can include computerized codes in the form of one or more programs, which are stored in the first storage device 13. The first processor 12 executes the computerized codes to provide functions of the function modules 101-104.

The connection module 101 can connect the electronic device 1 with at least three message transmitters 2, and receive messages from the message transmitters 2, when the electronic device 1 searches for the message transmitters 2 through the first connection device 11. The message received from each message transmitter 2 includes location information of each message transmitter 2 and a floor plan of the building. The message received from each message transmitter 2 can also include other information, such as discount information.

In some embodiments, the connection module 101 also determines whether a floor plan has been stored in the electronic device 1 when a floor plan is received. If the floor plan has been stored in the electronic device 1, the connection module 101 will not store the received floor plan in the electronic device 1 again.

The determination module 102 can determine a current position of the electronic device 1 according to the location information of each message transmitter 2 and signal strength of each connection between the electronic device 1 and each message transmitter 2, when receiving a fire alarm and a position of the fire.

The calculation module 103 can calculate an optimal escape route according to the floor plan of the building, the position of the electronic device 1, and the position of the fire. The calculation module 103 can also mark the position of the electronic device 1 and the optimal escape route on the floor plan of the building, and display the floor plan on the display device 14 of the electronic device 1.

The navigation module 104 can compare the current position of the electronic device 1 with the optimal escape route. When the current position of the electronic device 1 does not deviate from the optimal escape route, the navigation module 104 prompts a next step in a default manner, for example, "Turn left in three meters." When the current position of the electronic device 1 deviates from the optimal escape route, the navigation module 104 prompts a right direction in a default manner, for example, "Direction error, please turn round and go back the way you came." In this embodiment, the default manner is playing a voice and prompting a window.

Figure 3:
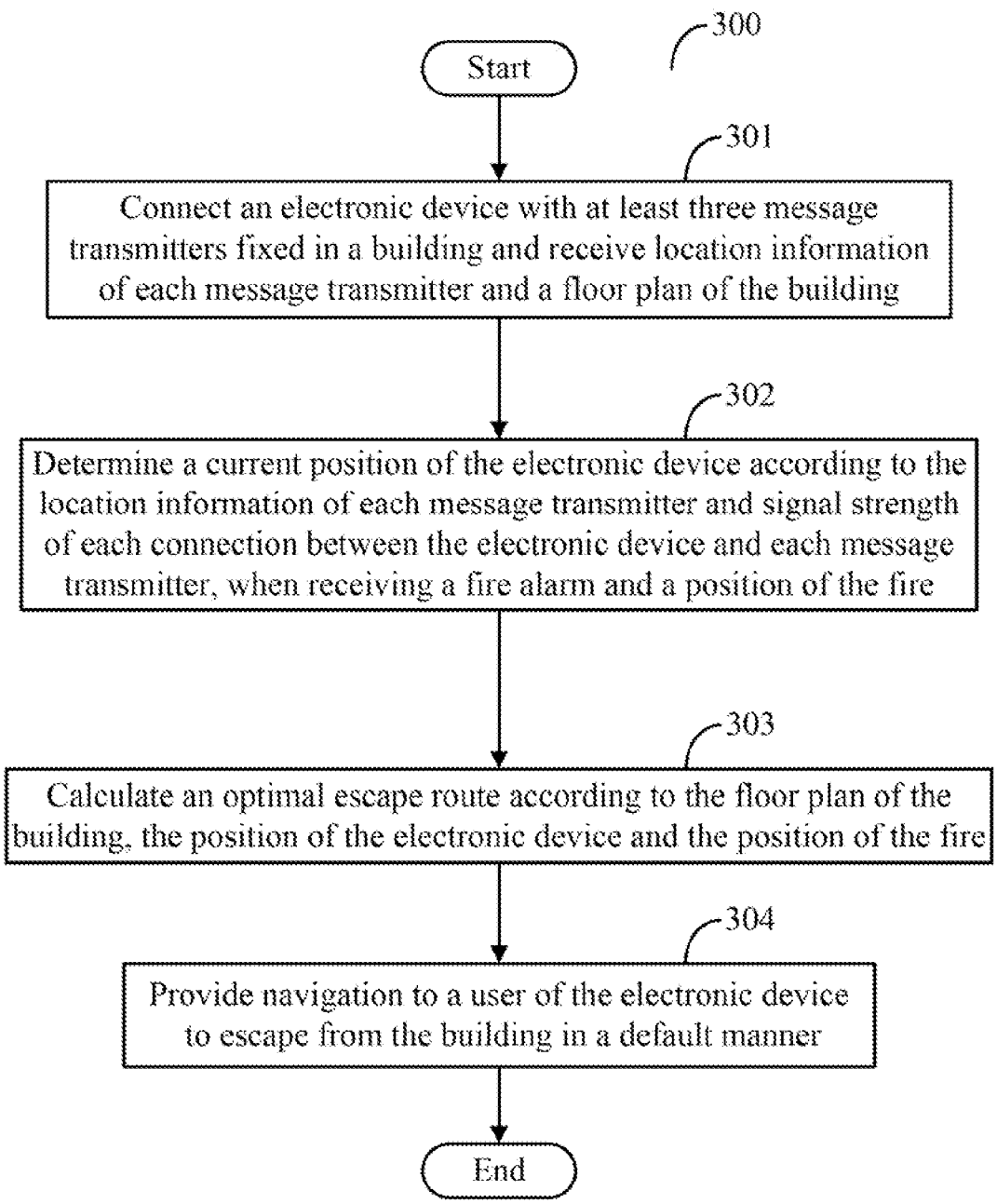
FIG. 3 is a flowchart of one example embodiment of a navigation method for indoor escaping.

Referring to FIG. 3, a flowchart is presented in accordance with an example embodiment. The example method 300 is provided by way of example, as there are a variety of ways to carry out the method. The example method 300 described below can be carried out using the configurations illustrated in FIG. 1, for example, and various elements of these figures are referenced in explaining the example method 300. Each block shown in FIG. 3 represents one or more processes, methods, or subroutines, carried out in the example method 300. Furthermore, the illustrated order of blocks is illustrative only and the order of the blocks can be changed. Additional blocks can be added or fewer blocks may be utilized without departing from this disclosure. The example method 300 can begin at block 301.

At block 301, a connection module connects an electronic device with at least three message transmitters, and receives messages from each message transmitter, when the electronic device searches for the message transmitters through an first connection device. The message received from each message transmitter includes location information of each message transmitter and a floor plan of the building. The message received from each message transmitter can also include other information, such as discount information.

In some embodiments, the connection module also determines whether a floor plan has been stored in the electronic device when a floor plan is received. If the floor plan has been stored in the electronic device, the connection module will not store the received floor plan in the electronic device again.

When a fire is detected by a message transmitter, the message transmitter sends the position of the fire to a control center. The control center sends a fire alarm and the position of the fire to all electronic devices (FIG. 1 shows only one) through the message transmitters.

At block 302, a determination module determines a current position of the electronic device according to the location information of each message transmitter and signal strength of each connection between the electronic device and each message transmitter, when receiving a fire alarm and a position of the fire.

At block 303, a calculation module calculates an optimal escape route according to the floor plan of the building, the position of the electronic device, and the position of the fire. The calculation module also marks the position of the electronic device and the optimal escape route on the floor plan of the building, and displays the floor plan on a display device of the electronic device.

At block 304, a navigation module provides navigation to the user of the electronic device to escape from the building in a default manner. In this embodiment, the default manner is playing a voice and prompting a window.

Figure 4:
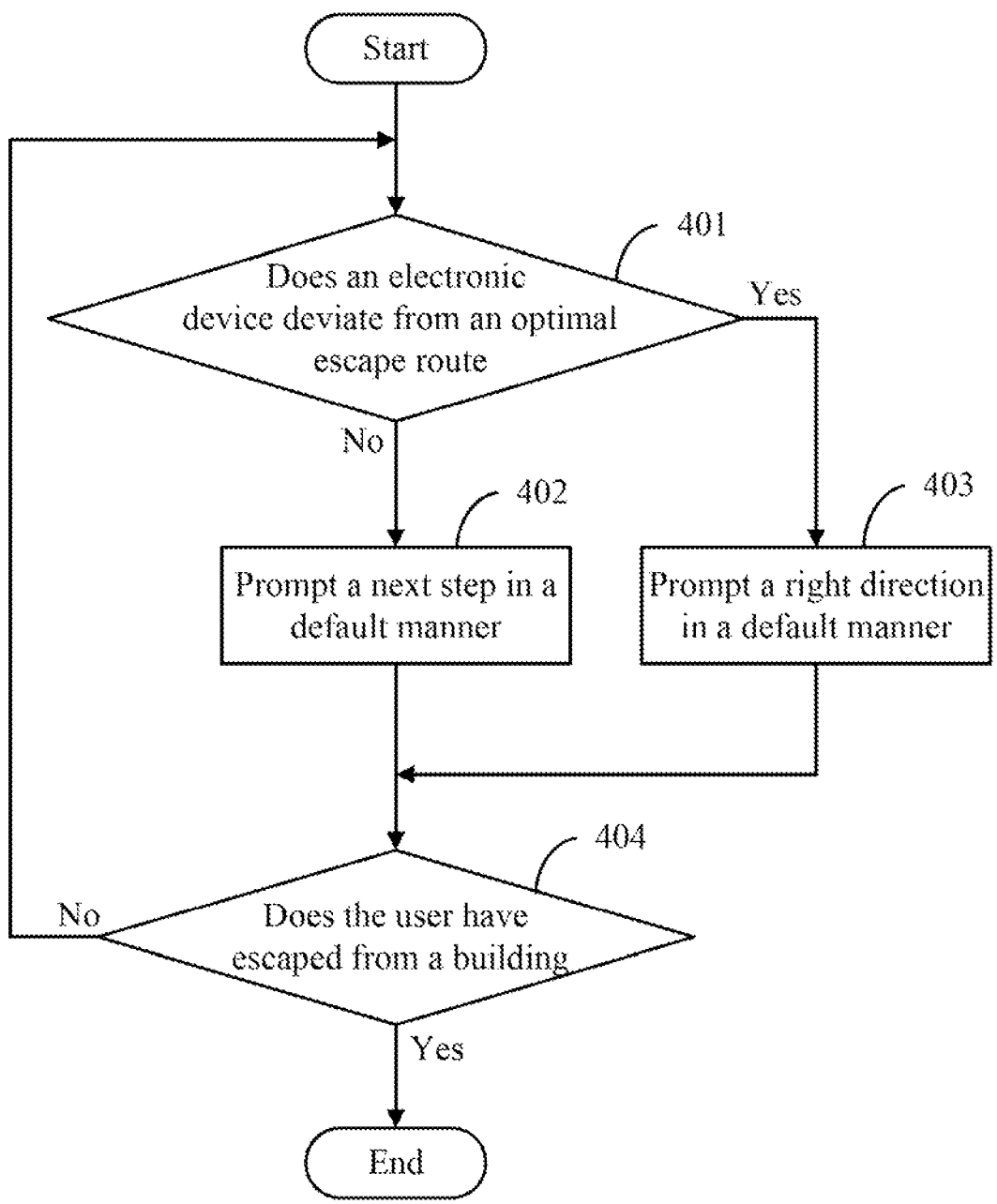
FIG. 4 is a flowchart of one example embodiment of providing navigation to a user to escape from a building.

FIG. 4 is a flowchart of one example embodiment of providing navigation to a user to escape from a building.

At block 401, a navigation module compares the current position of the electronic device with the optimal escape route. If the current position of the electronic device does not deviate from the optimal escape route, block 402 is executed. If the current position of the electronic device deviates from the optimal escape route, block 403 is executed.

At block 402, the navigation module prompts a next step in a default manner through a prompting device. Block 404 is executed, for example, "Turn left in three meters."

At block 403, the navigation module prompts a right direction in a default manner through the prompting device. Block 404 is executed, for example, "Direction error, please turn round and go back the way you came." In some embodiments, when the current position of the electronic device deviates from the optimal escape route, the navigation module also calculates a new escape route, and navigates the user of the electronic device to escape from the building in the new escape route.

At block 404, the navigation module determines whether the user of the electronic device has escaped from the building. If the user has escaped from the building, process is end. If the user has not escaped from the building, block 401 is executed.

When the user of the electronic device has not escaped from the building, the navigation module also sends the current position of the electronic device every a predetermined time period to the control center through the message transmitters. For example, the navigation module sends the current position of the electronic device and the IMIE (International Mobile Equipment Identity) of the electronic device to the control center. When the control center received the positions of electronic device, the control center can determine whether the user of the electronic device is trapped. For example, if the electronic device does not move beyond a certain range within a period of time, the control center determines the user of the electronic device is trapped.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. A navigation method for indoor escaping being executed by at least one processor of an electronic device, the method comprising:
   connecting the electronic device with at least three message transmitters fixed in a building around the electronic device;
   receiving messages from each message transmitter, the messages comprising location information of each message transmitter and a floor plan of the building;
   determining a current position of the electronic device according to the location information of each message transmitter and signal strength of each connection between the electronic device and each message transmitter, when receiving a fire alarm and a position of the fire;
   calculating an optimal escape route according to the floor plan of the building, the position of the electronic device, and the position of the fire;
   comparing the current position of the electronic device with the optimal escape route;
   prompting a next step in a default manner when the current position of the electronic device does not deviate from the optimal escape route; and
   prompting a right direction in a default manner when the current position of the electronic device deviates from the optimal escape route.

2. The method according to claim 1, further comprising:
   marking the position of the electronic device and the optimal escape route on the floor plan, and displaying the floor plan on a display device of the electronic device.

3. The method according to claim 1, wherein the default manner comprises playing a voice and prompting a window.

4. The method according to claim 1, further comprising:
calculating a new escaping route according to the floor plan of the building, the current position of the electronic device, and the position of the fire, and navigating the user of the electronic device to escape from the building in the new escape route, when the current position of the electronic device deviates from the optimal escape route.

5. The method according to claim 1, further comprising:
sending the current position of the electronic device every a predetermined time period to a control center through the message transmitters.

6. The method according to claim 5, further comprising:
the control center determining whether a user of the electronic device is trapped according to current positions of the electronic device.

7. The method according to claim 6, wherein the control center determines the user of the electronic device is trapped if the current position of the electronic device does not move beyond a certain range within a period of time.

8. An electronic device, the electronic device comprising:
at least one processor;
a connection device;
a display device;
a prompting device; and
a storage device that stores one or more programs which, when executed by the at least one processor, causes the at least one processor to:
connect with at least three message transmitters fixed in a building around the electronic device through the connection device;
receive messages from each message transmitter, the messages comprising location information of each message transmitter and a floor plan of the building;
determine a current position of the electronic device according to the location information of each message transmitter and signal strength of each connection between the electronic device and each message transmitter, when receiving a fire alarm and a position of the fire;
calculate an optimal escape route according to the floor plan of the building, the position of the electronic device, and the position of the fire;
compare the current position of the electronic device with the optimal escape route;
prompt a next step in a default manner when the current position of the electronic device does not deviate from the optimal escape route; and
prompt a right direction in a default manner when the current position of the electronic device deviates from the optimal escape route.

9. The electronic device according to claim 8, wherein the at least one processor further marks the position of the electronic device and the optimal escape route on the floor plan, and displays the floor plan on the display device of the electronic device.

10. The electronic device according to claim 8, wherein the default manner comprises playing a voice and prompting a window.

11. The electronic device according to claim 8, wherein the at least one processor further calculates a new escaping route according to the floor plan of the building, the current position of the electronic device, and the position of the fire, and navigates the user of the electronic device to escape from the building in the new escape route, when the current position of the electronic device deviates from the optimal escape route.

12. The electronic device according to claim 8, wherein the at least one processor further sends the current position of the electronic device every a predetermined time period to a control center through the message transmitters.

13. The electronic device according to claim 12, wherein the control center determines whether a user of the electronic device is trapped according to current positions of the electronic device.

14. The electronic device according to claim 13, wherein the control center determines the user of the electronic device is trapped if the current position of the electronic device does not move beyond a certain range within a period of time.

15. A non-transitory storage medium having shored thereon instruction that, when executed by at least one processor of an electronic device, causes the at least one processor to perform a navigation method for indoor escaping, the electronic device comprising a connection device, a display device and a prompting device, the method comprising:
connecting the electronic device with at least three message transmitters fixed in a building around the electronic device through the connection device;
receiving messages from each message transmitter, the messages comprising location information of each message transmitter and a floor plan of the building;
determining a current position of the electronic device according to the location information of each message transmitter and signal strength of each connection between the electronic device and each message transmitter when receiving a fire alarm and a position of the fire;
calculating an optimal escape route according to the floor plan of the building, the position of the electronic device and the position of the fire;
comparing the current position of the electronic device with the optimal escape route;
prompting a next step in a default manner when the current position of the electronic device does not deviate from the optimal escape route; and
prompting a right direction in a default manner when the current position of the electronic device deviates from the optimal escape route.

16. The non-transitory storage medium according to claim 15, wherein the method further comprising:
marking the position of the electronic device and the optimal escape route on the floor plan, and displaying the floor plan on a display device of the electronic device.

17. The non-transitory storage medium according to claim 15, wherein the default manner comprises playing a voice and prompting a window.

18. The non-transitory storage medium according to claim 15, wherein the method further comprising:
calculating a new escaping route according to the floor plan of the building, the current position of the electronic device, and the position of the fire, and navigating the user of the electronic device to escape from the building in the new escape route, when the current position of the electronic device deviates from the optimal escape route.

19. The non-transitory storage medium according to claim 15, wherein the method further comprising:
sending the current position of the electronic device every a predetermined time period to a control center through the message transmitters.

20. The non-transitory storage medium according to claim 19, wherein the control center determines the user of the electronic device is trapped if the current position of the electronic device does not move beyond a certain range within a period of time.

* * * * *